United States Patent
Scarborough

(10) Patent No.: US 7,040,035 B1
(45) Date of Patent: May 9, 2006

(54) TAPE MEASURE WITH COMBINATION WHEELED DIRECTIONAL CONTROLLING DEVICE AND MARKER

(76) Inventor: Dane Scarborough, P.O. Box 3351, Hailey, ID (US) 83333-3351

( * ) Notice: Subject to any disclaimer, the term of this patent is extended or adjusted under 35 U.S.C. 154(b) by 0 days.

(21) Appl. No.: 11/000,143

(22) Filed: Nov. 30, 2004

(51) Int. Cl.
*G01B 3/10* (2006.01)

(52) U.S. Cl. .............................. 33/668; 33/768; 33/769

(58) Field of Classification Search ................ 33/668, 33/768, 770, 761, 769, 759, 755, 42, 41.3, 33/41.6; D10/74
See application file for complete search history.

(56) References Cited

U.S. PATENT DOCUMENTS

| | | | |
|---|---|---|---|
| 41,797 A * | 3/1864 | Van Derenter ................ 30/293 |
| 259,556 A | 6/1882 | Kulman |
| 491,715 A | 2/1893 | Mondor |
| 586,157 A * | 7/1897 | Boisvert ..................... 33/41.3 |
| 1,145,922 A * | 7/1915 | Rigaumont .................. 33/479 |
| 1,792,393 A * | 2/1931 | Phillips ........................ 33/42 |
| 2,021,275 A | 11/1935 | Warner |
| 2,305,065 A * | 12/1942 | Corkish ........................ 33/42 |
| 2,624,120 A | 1/1953 | Mills |
| 2,649,787 A | 8/1953 | Kobayashi |
| 2,763,929 A | 9/1956 | Metcalf |
| 3,063,157 A | 11/1962 | Keene |
| 3,220,112 A | 11/1965 | Quenot |
| 3,286,351 A * | 11/1966 | McAlister ..................... 33/42 |
| 3,526,964 A | 9/1970 | Clark, Jr. |
| 3,731,389 A | 5/1973 | King |
| 4,015,337 A | 4/1977 | Taylor |
| 4,439,927 A | 4/1984 | Elliott |
| 4,542,589 A | 9/1985 | Yamamoto |
| 4,551,847 A | 11/1985 | Caldwell |
| 4,630,376 A | 12/1986 | Pentecost |
| 4,649,649 A | 3/1987 | Fain |
| 4,667,412 A | 5/1987 | Carlson |
| 4,729,171 A | 3/1988 | Samson |
| 4,760,648 A | 8/1988 | Doak et al. |
| 4,965,941 A | 10/1990 | Agostinacci ................. 33/668 |
| 4,989,326 A | 2/1991 | O'Malley |
| 5,379,524 A | 1/1995 | Dawson |
| 5,416,978 A | 5/1995 | Kaufman |
| 5,430,952 A | 7/1995 | Betts |
| 5,435,074 A | 7/1995 | Holevas et al. |
| 5,477,619 A | 12/1995 | Kearns |
| 5,505,133 A | 4/1996 | Chen |
| 5,577,329 A | 11/1996 | States |
| 5,671,543 A | 9/1997 | Sears |
| 5,735,052 A | 4/1998 | Lin |
| 5,809,662 A | 9/1998 | Skinner |
| 5,815,939 A | 10/1998 | Ruffer |
| 5,829,152 A | 11/1998 | Potter et al. |
| 6,041,513 A | 3/2000 | Doak |
| 6,178,655 B1 | 1/2001 | Potter et al. |
| D438,130 S * | 2/2001 | Modisett ..................... D10/74 |

(Continued)

FOREIGN PATENT DOCUMENTS

| | | |
|---|---|---|
| JP | 63256802 A * | 10/1988 |
| WO | WO 02/08687 | 1/2002 |

*Primary Examiner*—R. Alexander Smith
(74) *Attorney, Agent, or Firm*—Stephen M. Nipper; Dykas, Shaver & Nipper

(57) ABSTRACT

A marking tape measure having a marking applicator, which is selectively engageable, adjacent this applicator being a wheel or other directional guide for guiding the applicator generally perpendicular to the direction the tape measure's tape blade extends from the tape measure's case.

24 Claims, 4 Drawing Sheets

U.S. PATENT DOCUMENTS

| | | |
|---|---|---|
| 6,212,787 B1 | 4/2001 | Dixon |
| 6,264,272 B1 | 7/2001 | Jones et al. |
| 6,363,622 B1 | 4/2002 | Stratton |
| 6,434,854 B1 * | 8/2002 | MacColl et al. ............... 33/668 |
| 6,513,261 B1 | 2/2003 | Johnson |
| 6,547,098 B1 | 4/2003 | Kaye |
| 6,574,881 B1 * | 6/2003 | Cole, III ...................... 33/668 |
| 6,910,280 B1 * | 6/2005 | Scarborough ................ 33/768 |
| 2001/0029673 A1 | 10/2001 | Brown et al. |
| 2002/0129511 A1 | 9/2002 | Laughlin et al. |
| 2004/0143982 A1 * | 7/2004 | Braun ......................... 33/429 |
| 2005/0252021 A1 * | 11/2005 | Kang .......................... 33/769 |

* cited by examiner

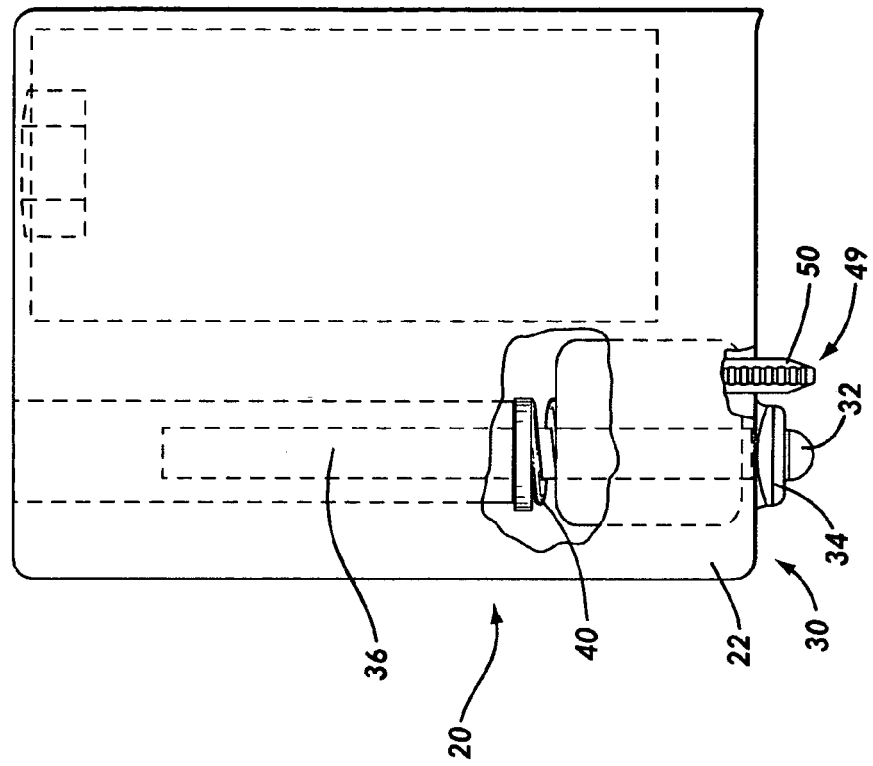
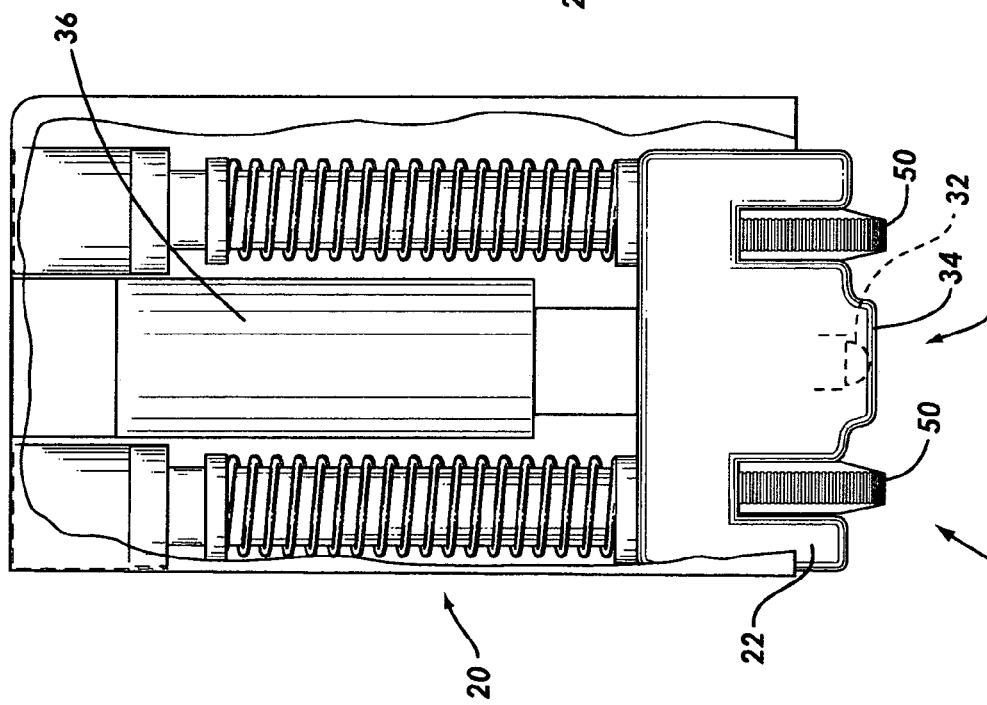

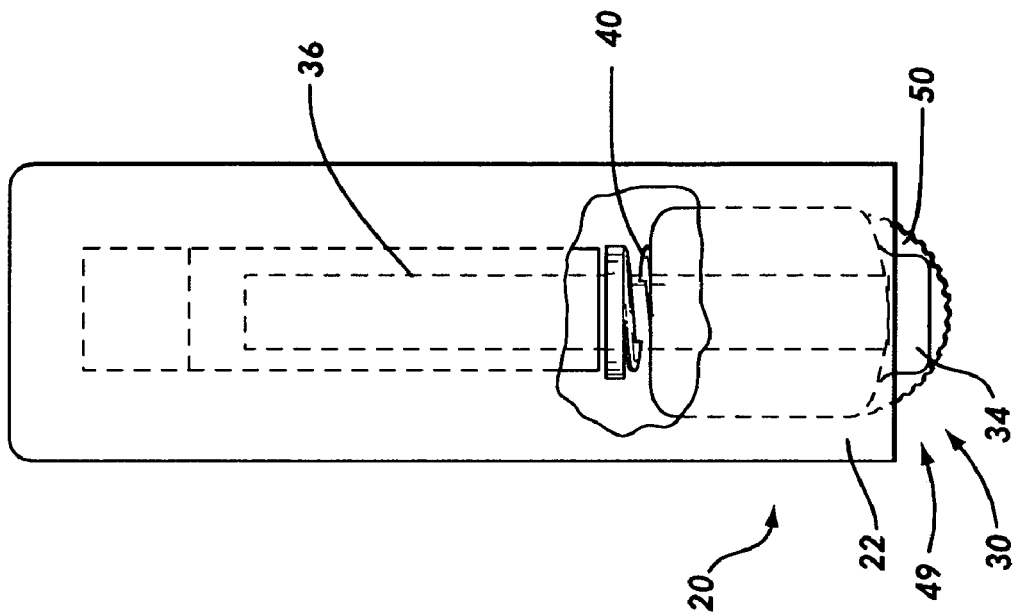
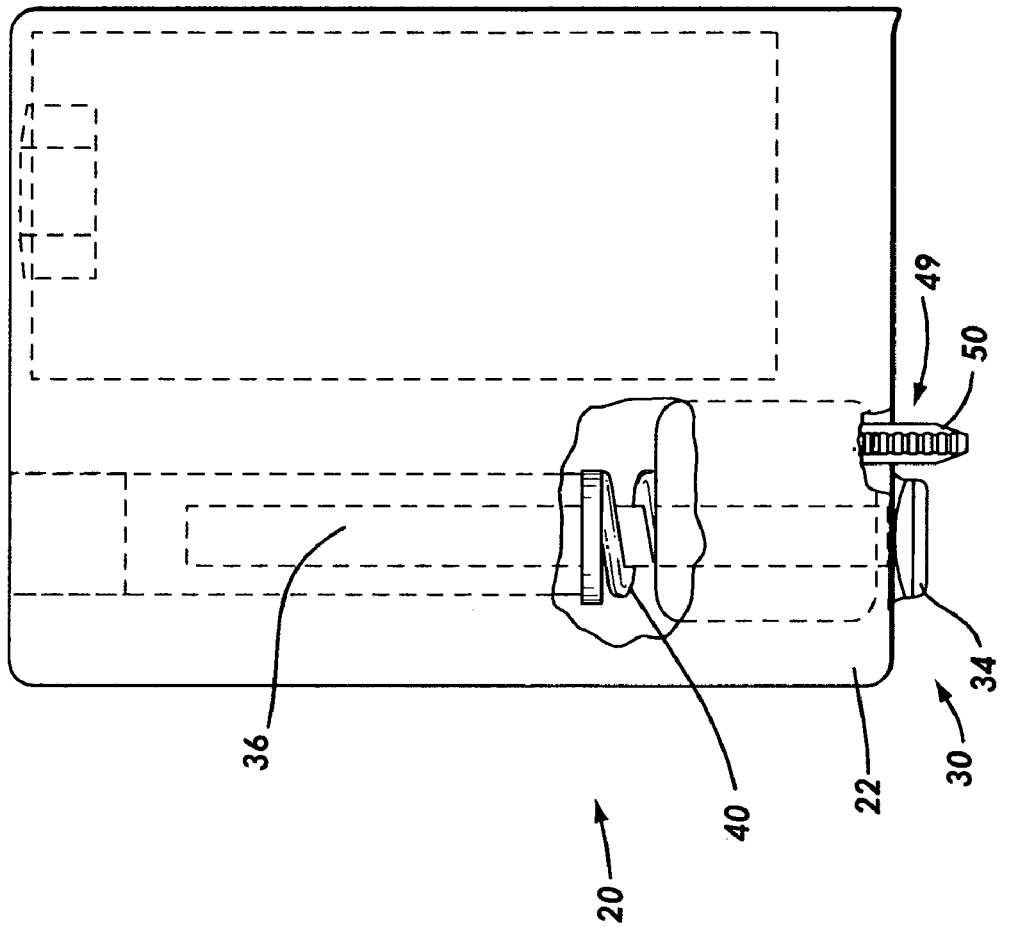

US 7,040,035 B1

TAPE MEASURE WITH COMBINATION WHEELED DIRECTIONAL CONTROLLING DEVICE AND MARKER

BACKGROUND OF THE INVENTION

1. Field of the Invention

The present invention generally relates to tape measures and more particularly to marking tape measures.

2. Background Information

Various forms and types of measuring devices are known to the prior art. One particular type of measuring device is known as a "tape measure." Tape measures typically comprise a flexible tape resiliently coiled within a housing. The tape is normally printed with incremental measuring marks for measuring distances. In use, the flexible tape is uncoiled and extended from the housing and placed on a surface to be measured. Distances can then be marked with a separate marking tool, such as a pencil, directly onto the surface measured.

Numerous devices incorporating marking tools inside and outside the tape measure housing are known in the prior art. These include devices that are affixed to existing tape measure housings, for instance, the self-adhesive scoring attachment of U.S. Pat. No. 6,041,513 (Doak). These devices also include marking tools, which are affixed to belt clips of existing tape measure housings. For example, U.S. Pat. No. 4,760,648 (Doak et al.) which discloses a marking device is adapted to be mounted on one side of the tape measure, namely as a replacement belt clip.

These devices also include housings configured for receipt there through of marking means, such as pencils or pens. For example, U.S. Pat. No. 5,735,052 (Lin) discloses a tape measure having formed therein a passage for receiving there through the marking means.

These devices also include marking tools that are integral with the tape measure housing. For instance, U.S. Pat. No. 5,435,074 (Holevas et al.) discloses a tape measure that has a marker attached to the tape measure's lock so that depression of the lock mechanism also extends the marker out of the housing of the tape measure. Also, U.S. Pat. No. 4,015,337 (Taylor) discloses a marking device integrally formed into the housing of the tape measure.

These devices can also include scoring means rather than marking (ink, graphite, etc.) means. For instance, U.S. Pat. No. 2,649,787 (Kobayashi), U.S. Pat. No. 3,063,157 (Keene) and U.S. Pat. No. 3,526,964 (Clark, Jr.).

One problem with many of these conventional measuring devices is the number of procedures required to complete the task of measuring and marking materials accurately. Many of these prior art devices require that the tape measure blade be locked into position prior to the use of the marking device. For instance, the patent to Holevas et al. discussed above. Such use can require additional digital manipulation of the tape measure, and due to the contact of the locking mechanism to the blade, can cause the tape measure blade to shift from the desired position thereby causing inaccuracies.

Other problems with conventional measuring devices are their size and complexity. Many prior art devices have protrusions that inhibit or eliminate the ability to carry the tape measure in the standard pouch or holder that is often provided on a carpenter's or tradesmen's tool belt. Furthermore, if the tip of the marking instrument is exposed, it can cause damage or harm to other objects, or it can be damaged itself.

What is needed is a tape measure or a marking device that is able to be utilized with a tape measure, which is readily able to allow an individual to measure and mark a wide variety of materials in an efficient and economical manner; requires little to no maintenance; is not prone to inaccuracy; is versatile; is simple to use; is compact and not awkwardly shaped; and/or is not prone to damage when in or out of use.

In these respects, a tape measure that incorporates a marking device, according to the present invention, substantially departs from the conventional concepts and designs of the prior art, and in so doing provides an apparatus primarily developed for some, if not all, of the above needs.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

One embodiment of the present invention comprises an improved marking tape measure. This tape measure having a body and a tape blade configured for extending therefrom in a first direction. The tape measure having a marking device, this marking device comprising a spring biased body connected to the tape measure body. The tape measure further having a mark applicator configured for applying a marking indicia to a surface. The body is able to be moved from a first position to a second position. The body covering a mark applicator when in said first position, the body is biased to this first position by default. The body retracted from and exposing said mark applicator when in the second position. The marking device further comprising at least one wheel adjacent the mark applicator. This wheel oriented to roll along the surface generally perpendicular to the first direction thereby allowing a directional mark to be made upon this surface using the mark applicator, the mark being generally perpendicular to the first direction at a desired location.

The purpose of the foregoing Abstract is to enable the United States Patent and Trademark Office and the public generally, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

BRIEF DESCRIPTION OF THE DRAWINGS

FIG. 2 is a side view of a second embodiment of the present invention.

FIG. 3 is a side view of a third embodiment of a marking device of the present invention shown with the wheel retracted and the marking device engaged.

FIG. 4 is a second side view of the embodiment of FIG. 3 showing the marking device retracted and unengaged, and showing the wheel extended.

FIG. 5 is a front-end view of the embodiment of FIG. 3 showing the marking device retracted and unengaged, and showing the wheel extended.

DESCRIPTION OF THE PREFERRED EMBODIMENTS

Figure 1:
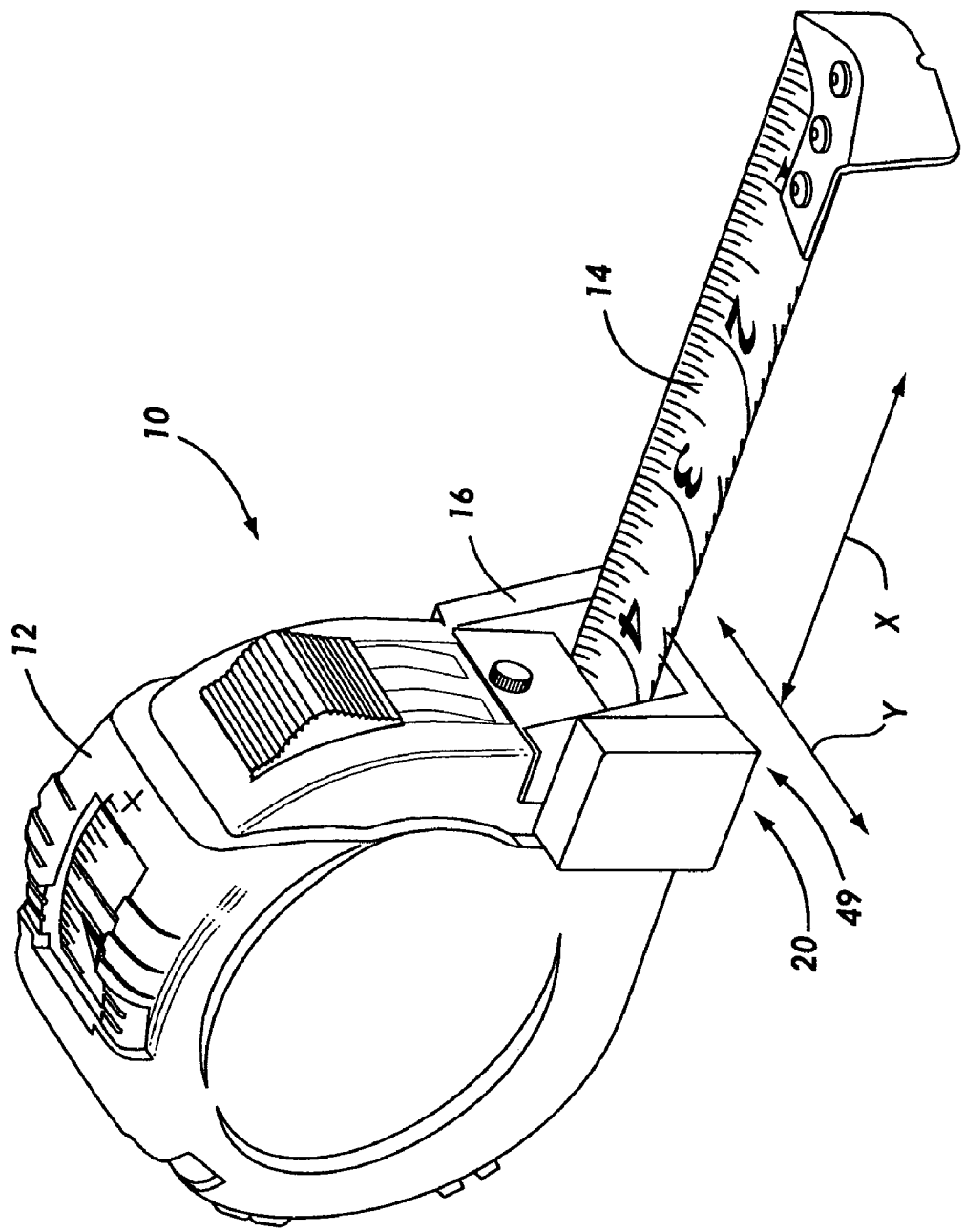
FIG. 1 is a perspective view of one embodiment of the present invention integrated into a tape measure.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Many different types and embodiments of marking devices are disclosed in my other patents and patent applications, including U.S. Pat. No. 6,698,104 titled TAPE MEASURE THAT INCORPORATES A MARKING DEVICE which issued on Mar. 2, 2004, U.S. Pat. No. 6,701,635 titled TAPE MEASURE THAT INCORPORATES A MARKING DEVICE which issued on Mar. 9, 2004, U.S. Pat. No. 6,637,125 titled DUAL BASED TAPE MEASURE which issued on Oct. 28, 2003, U.S. Pat. No. 6,701,636 titled TAPE MEASURE THAT INCORPORATES A DIRECTIONAL MARKING DEVICE which issued on Mar. 9, 2004, U.S. application Ser. No. 10/753,924 titled TAPE MEASURE THAT INCORPORATES A MARKING DEVICE which was filed on Jan. 6, 2004, U.S. application Ser. No. 10/758,387 titled TAPE MEASURE THAT INCORPORATES A WHEELED MARKING DEVICE FOR APPLYING A MARKING INDICIA which was filed on Jan. 14, 2004, U.S. application Ser. No. 10/785,605 titled TOP READ MARKING TAPE MEASURE which was filed on Feb. 23, 2004, and U.S. Application No. 60/547,258 titled TAPE MEASURE THAT INCORPORATES A CHALK LINE STYLE MARKING DEVICE which was filed on Feb. 23, 2004, the disclosures of which are incorporated herein.

Referring initially to FIG. 1, shown is one embodiment of the present invention. The figure shows a tape measure 10 having a case 12, bearing a marking device 20. A directional guide assembly 49 is included for guiding the marking device 20 on the surface to be measured and marked. As is common for "tape measures," the tape measure 10 has an orifice defined in its front side 16 for allowing a tape measure blade 14 bearing measuring indicia to extend therefrom in a first direction X.

The present invention's marking device(s) 20, in its preferred embodiments, are configured for applying a mark to a surface to be measured and marked in a second direction Y generally perpendicular to the first direction X. As such, a user could measure and mark a desired length by moving the tape measure sideways, perpendicular to the first direction X, thereby applying a mark to the surface generally perpendicular to the first direction, this mark relating to a desired cut location or other measurement.

Referring now to FIG. 2, shown is one embodiment of the marking device 20 of the present invention. This embodiment showing a retractable mark applicator 30 having a retractable tip 32, which is protected via a shroud 34. This tip is configured to retract into the shroud 34 when not in use (as shown) so that a user does not get the marking substance upon their clothing, hands, etc. In the embodiment shown, the shroud is part of the directional guide assembly 49.

It is preferred that the marking device 20 have a body 22 having fixed thereto one or more wheels 50 (FIG. 2 showing two wheels) mounted upon axles. While the preferred embodiments of the present invention utilize wheels mounted upon axles, other directional devices, including, but not limited to those described in my aforementioned patent applications and patents, belts, wheels and curved portions. These directional devices are preferably configured to be oriented generally perpendicular to the first direction X.

It is preferred that the directional guide assembly 49 be spring biased to the tape measure case 12 using one or more springs 40 so that the device is held with the tip retracted and not exposed by default (the springs bias the shroud 34 to protect the tip 32). In the embodiment shown in FIG. 2, this is accomplished by fixing the mark applicator 30 in relation to the tape case 12 and biasing the directional guide assembly 49 via at least one spring. While a spring mount/bias is preferred, other mounts, including but not limited to slide mounts and pivot mounts are likewise envisioned.

In use, when a user presses downward on the tape measure case upon a surface to be measured and marked, the directional guide assembly slides upwards while the mark applicator 30 is held fixed in place (thereby exposing the mark applicator tip 32). As such, the tip extends out of the shroud 34 (or the shroud withdraws from the tip) thereby exposing the tip so a mark can be made on the surface. This movement is preferably generally limited to the depth of the retraction of the tip so that the wheels can still barely engage the surface and control the direction, namely keeping the tip moving in direction Y, generally perpendicular to direction X. As such, the directional guide (wheel) can be rolled along the surface, working as a directional marker as discussed in my prior applications, thereby creating a line upon the surface to be measured and marked which is generally perpendicular to the first direction X.

Then, when the user is done making the mark, downward pressure could be released and the body of the directional guide assembly 49 (biased by the spring(s)) would re-extend to cover the tip 32 (the shroud covering the tip).

While this embodiment is preferred, other embodiments are envisioned that could likewise achieve the same purpose as well as being functionally equivalent, including various alternative ways of retracting and/or extending the tip relative to the body. For instance, the tip could be spring biased and the body fixed, they both could be configured for movement, they both could be configured to be fixed, etc. Also, instead of the tip being retracted into the mark applicator, the shroud could be the component, which raises or lowers based upon whether or not the user desires a mark. In another embodiment, the tip 32 could be extendable through clicking on a button (like a retractable pen tip is extended).

It is preferred that the marking device 20 preferably be either integral to the tape measure's case or an add-on that can be attached and detached from the tape measure's case, as has been previously discussed in my aforementioned patent applications/patents.

FIGS. 3–7 show a second embodiment of the present invention utilizing the same general components but having one wheel 50 instead of two wheels (as shown in FIG. 2). Such a single wheeled embodiment is preferred. Using more than one wheel may increase accuracy, for instance a second (or more) wheel located adjacent thereto or distant therefrom (for instance at the opposite (rear) end of the tape case (perhaps with a second mark applicator)).

Figure 7:
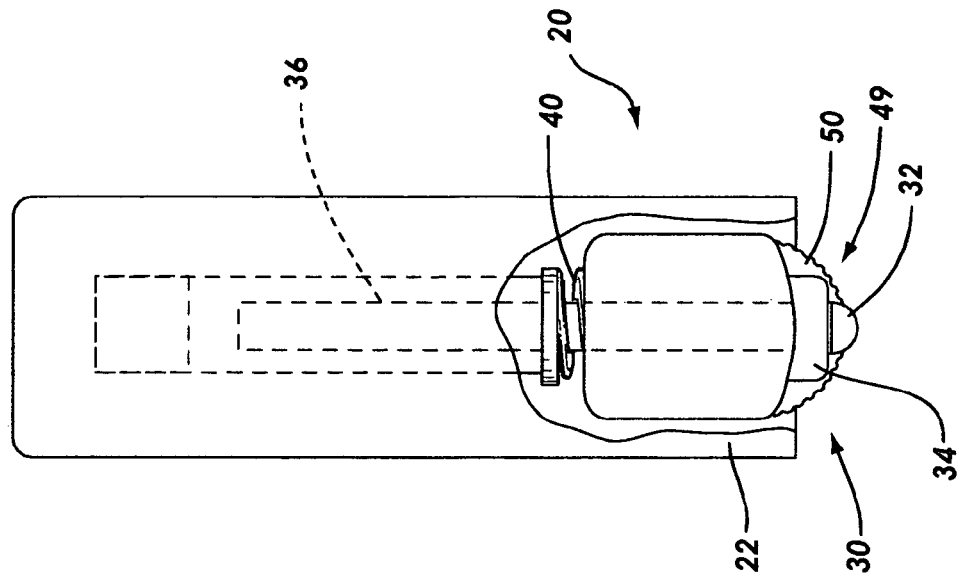
FIG. 7 is a front side view of the embodiment of FIG. 3 showing the marking device engaged and extended with the wheel retracted.
Figure 6:
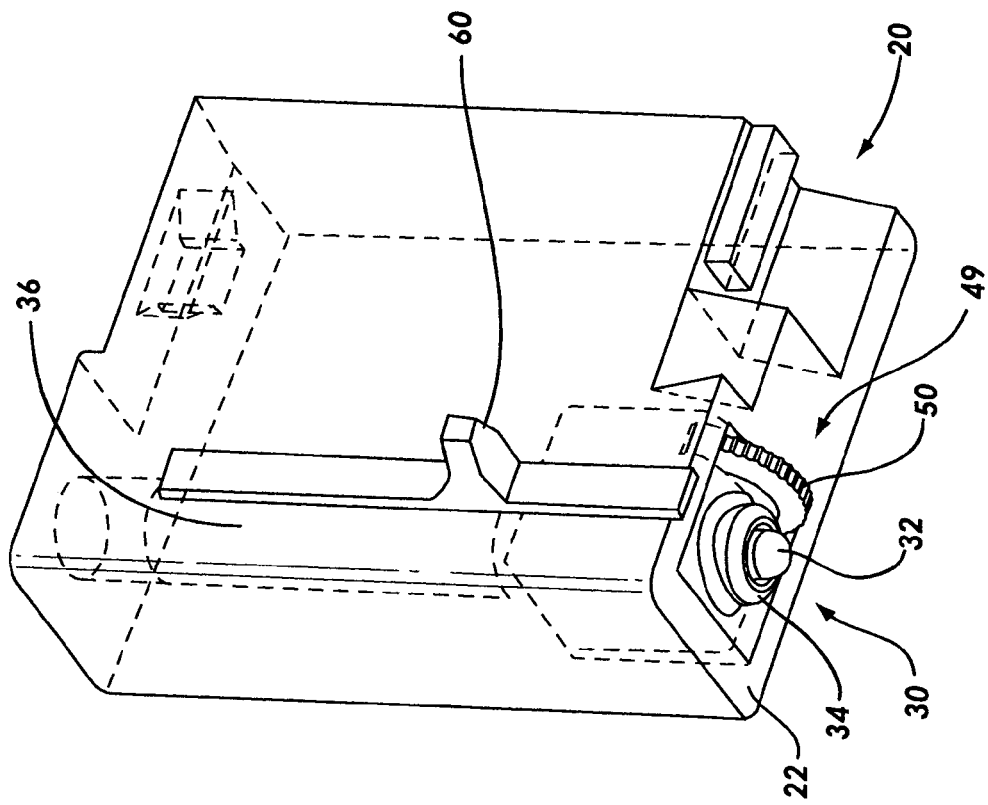
FIG. 6 is a perspective view of the embodiment of FIG. 3 also showing a marking indicator.

FIG. 3 shows the wheel 50 generally retracted and the tip 32 exposed out of the shroud 34, FIG. 4 shows the tip 32 retracted back within the shroud 34 and the wheel 50 extending past the edge of the shroud 34 and FIG. 5 shows a front view of the embodiment of FIG. 4. FIGS. 6–7 show the marking device 20 having a body 22 with a mark applicator 30, this mark applicator having a tip 32 which is configured for retraction within a shroud 34 as discussed in the prior embodiments.

These figures (FIGS. 3–5) show the mark applicator tip shown in the engaged position, extending from the shroud 34. The body 22 further (preferably) having an arrow 60 or other indicia applied thereto for indicating to a user the general location of the mark applicator tip 32 so that in use, a user can make the mark where so desired. This arrow concept is discussed in detail in my prior applications (mentioned supra and incorporated by reference).

The present invention obviously could be used with any type of mark applicator and/or applicator tip including, but not limited to ball point pens, felt pens, other types of pens, markers, crayons, erasable ink, liquid graphite, chalk, glue, paint, dye or other materials which can be so applied. While the embodiment shown uses a ballpoint style applicator using erasable ink (such as Paper Mate's Eraser.Max®), obviously other types of applicators would likewise be used and are deemed included within this disclosure.

In use of the preferred embodiment, a user could extend the tape blade 14 out of the tape blade case 12 of the tape measure 10 in a first direction, extending said tape blade 14 a desired distance until the arrow indicator 60 is generally adjacent the desired distance to be marked. The user could then push downwards on the tape measure thereby engaging the tape wheels 50 into the mark applicator thereby retracting the shroud 34 from around the tip 32 (causing the tip 32 to extend from the shroud 34 adjacent the wheel, etc.) so that the wheels can directionally (perpendicular to the first direction) roll along the surface, and at the same time the tip can apply a marking substance to the surface to be measured and marked thereby making a mark generally perpendicular to the first direction. When the desired mark is made, the downward pressure would be released and the tip would be retracted.

Obviously, the teachings of this application could likewise be combined with the embodiments and teachings of my prior applications (mentioned supra) to arrive at new embodiments of this invention. These various embodiments are likewise intended as part of this disclosure and are incorporated herein.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. A marking tape measure for marking a surface at a desired measurement, said marking tape measure comprising:
    a housing for containing a measuring tape therein, said housing comprising a front wall defining a tape blade aperture;
    a measuring tape having measuring indicia thereon, said tape being extendible in a first direction out of the housing with the remainder of the tape being coiled in said housing;
    at least one marker attaching to said housing, said marker configured for making said surface; and
    at least one directional guide assembly on said housing and disposed generally perpendicular to said first direction, said directional guide assembly for guiding said housing along said surface generally perpendicular to said first direction thereby allowing said marker to make a mark on said surface generally perpendicular to said first direction.

2. The marking type tape measure of claim 1, wherein said tape measure is configured for use in a marking mode and in a non-marking mode, wherein when in said marking mode said marker is configured for applying a mark to said surface, wherein when in said non-marking mode said marker is not configured for applying a mark to said surface.

3. The marking tape measure of claim 2, wherein said non-marking mode comprises the retraction of said marker into a marker body.

4. The marking tape measure of claim 3, wherein said tape measure includes a spring for holding said marker retracted by default.

5. The marking tape measure of claim 3, wherein said marking mode comprises the extension of said marker from said marker body.

6. The marking tape measure of claim 5, wherein said directional guide assembly is movably attached to said marker body so that compression of said directional guide assembly towards said housing causes said directional guide assembly and body to move relative to said marker thereby exposing said marker.

7. The marking tape measure of claim 1, wherein said directional guide assembly comprises a pair of parallel guide wheels with said marker located there between said guide wheels.

8. The marking tape measure of claim 1, wherein said marker attaches to said housing at said front wall.

9. The marking tape measure of claim 1, wherein said directional guide assembly comprises a guide wheel oriented generally perpendicular to said first direction.

10. The marking tape measure of claim 1, wherein said housing comprises an indicator adjacent said tape blade aperture, said indicator aligned with said marker.

11. A marking tape measure for marking a surface at a desired measurement, said marking tape measure comprising:
    a housing for containing a measuring tape therein, said housing comprising a front wall defining a tape blade aperture;
    a measuring tape having measuring indicia thereon, said tape being extendible in a first direction out of the housing with the remainder of the tape being coiled in said housing;
    at least one marker attaching to said housing at said front wall, said marker configured for making said surface; and at least one guide wheel disposed generally perpendicular to said first direction, said guide wheel contacting said surface for guiding said housing along said surface generally perpendicular to said first direction thereby allowing said marker to make a mark on said surface generally perpendicular to said first direction;

wherein said tape measure is configured for use in a marking mode and in a non-marking mode, wherein when in said marking mode said marker is configured for applying a mark to said surface, wherein when in said non-marking mode said marker is not configured for applying a mark to said surface.

12. The marking tape measure of claim 11, wherein said non-marking mode comprises the retraction of said marker into a marker body.

13. The marking tape measure of claim 12, wherein said tape measure includes a spring for holding said marker retracted by default.

14. The marking tape measure of claim 12, wherein said marking mode comprises the extension of said marker from said marker body.

15. The marking tape measure of claim 14, wherein said wheel is movably attached to said marker body so that compression of said wheel towards said housing causes said wheel and body to move relative to said marker thereby exposing said marker.

16. The marking tape measure of claim 11, wherein said marker attaches to said housing at said front wall.

17. The marking tape measure of claim 11, wherein said guide wheel attaches to said housing at said front wall.

18. The marking tape measure of claim 11, wherein said housing comprises an indicator adjacent said tape blade aperture, said indicator aligned with said marker.

19. A marking tape measure comprising:
a tape measure, said tape measure having a body, said tape measure having a tape blade configured for extending there-from in a first direction; and
a marking device, said marking device comprising a spring biased body connected to said tape measure body and a mark applicator configured for applying a marking indicia to a surface, said body able to be moved from a first position to a second position, said body covering a mark applicator when in said first position, said body retracted from and exposing said mark application when in said second position, said marking device further comprising at least one wheel adjacent said mark applicator, said wheel oriented to roll along said surface generally perpendicular to said first direction thereby allowing a directional mark to be made upon said surface using said mark applicator generally perpendicular to said first direction at a desired location.

20. A marking tape measure for marking a surface at a desired measurement, said marking tape measure comprising:
a housing for containing a measuring tape therein, said housing comprising a front wall defining a tape blade aperture;
a measuring tape having measuring indicia thereon, said tape being extendible in a first direction out of the housing with the remainder of the tape being coiled in said housing;
at least one marker attaching to said housing, said marker configured for making said surface; and
at least one directional guide assembly disposed generally perpendicular to said first direction, said directional guide assembly for guiding said housing along said surface generally perpendicular to said first direction thereby allowing said marker to make a mark on said surface generally perpendicular to said first direction, said directional guide assembly being movably attached to a marker body so that compression of said directional guide assembly towards said housing causes said directional guide assembly and body to move relative to said marker thereby exposing said marker; and wherein said tape measure is configured for use in a marking mode and in a non-marking mode, wherein when in said marking mode said marker extends from said marker body for applying a mark to said surface, wherein when in said non-marking mode said marker is not configured for applying a mark to said surface.

21. A marking tape measure for marking a surface at a desired measurement, said marking tape measure comprising:
a housing for containing a measuring tape therein, said housing comprising a front wall defining a tape blade aperture;
a measuring tape having measuring indicia thereon, said tape being extendible in a first direction out of the housing with the remainder of the tape being coiled in said housing;
at least one marker attaching to said housing, said marker configured for making said surface; and
at least one directional guide assembly disposed generally perpendicular to said first direction, said directional guide assembly for guiding said housing along said surface generally perpendicular to said first direction thereby allowing said marker to make a mark on said surface generally perpendicular to said first direction, said directional guide assembly comprising a pair of parallel guide wheels with said marker located between said guide wheels.

22. A marking tape measure for marking a surface at a desired measurement, said marking tape measure comprising:
a housing for containing a measuring tape therein, said housing comprising a front wall defining a tape blade aperture;
a measuring tape having measuring indicia thereon, said tape being extendible in a first direction out of the housing with the remainder of the tape being coiled in said housing;
at least one marker attaching to said housing at said front wall, said marker configured for making said surface; and
at least one guide wheel disposed generally perpendicular to said first direction, said guide wheel for guiding said housing along said surface generally perpendicular to said first direction thereby allowing said marker to make a mark on said surface generally perpendicular to said first direction, wherein said guide wheel is movably attached to a marker body so that compression of said guide wheel towards said housing causes said wheel and body to move relative to said marker thereby exposing said marker;
wherein said tape measure is configured for use in a marking mode and in a non-marking mode, wherein when in said marking mode said marker extends from said marker body and is configured for applying a mark to said surface, wherein when in said non-marking mode said marker is not configured for applying a mark to said surface.

23. A marking tape measure for marking a surface at a desired measurement, said marking tape measure comprising:
- a housing for containing a measuring tape therein, said housing comprising a front wall defining a tape blade aperture;
- a measuring tape having measuring indicia thereon, said tape being extendible in a first direction out of the housing with the remainder of the tape being coiled in said housing;
- at least one marker attaching to said housing at said front wall, said marker configured for making said surface; and
- a pair of parallel guide wheels with said marker located between the guide wheels, said guide wheels disposed generally perpendicular to said first direction, said guide wheels for guiding said housing along said surface generally perpendicular to said first direction thereby allowing said marker to make a mark on said surface generally perpendicular to said first direction;
- wherein said tape measure is configured for use in a marking mode and in a non-marking mode, wherein when in said marking mode said marker is configured for applying a mark to said surface, wherein when in said non-marking mode said marker is not configured for applying a mark to said surface.

24. A marking tape measure for marking a surface at a desired measurement, said marking tape measure comprising:
- a housing for containing a measuring tape therein, said housing comprising a front wall defining a tape blade aperture;
- a measuring tape having measuring indicia thereon, said tape being extendible in a first direction out of the housing with the remainder of the tape being coiled in said housing;
- at least one marker attaching to said housing, said marker configured for making said surface; and
- at least one guide wheel on said housing and contacting said surface for guiding said housing along said surface thereby allowing said marker to make a mark on said surface generally perpendicular to said first direction.

* * * * *